E. Phillips.
Potato Digger.
No. 87,197.  Patented Feb. 23, 1869.
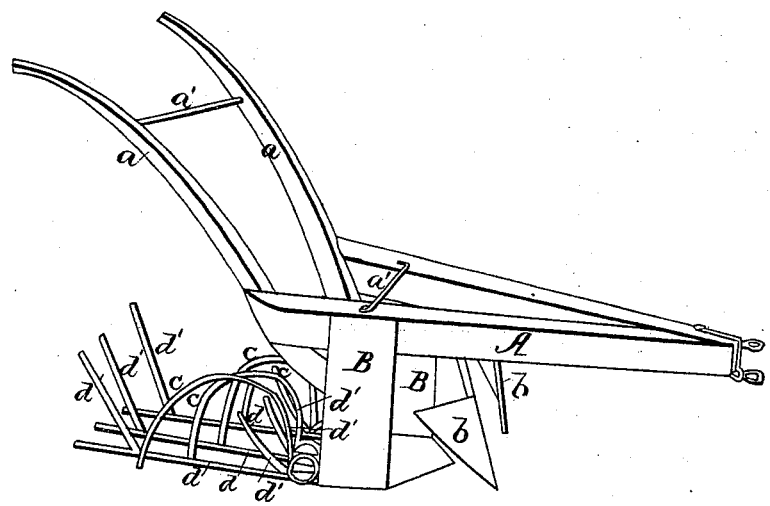
Witnesses;
C. O. Brown
Wm. T. Hutchinson.
Inventor;
E. Phillips.
Geo. E. Brown. Atty

United States Patent Office.

EPHRAIM PHILLIPS, OF NORTH BEAVER TOWNSHIP, PENNSYLVANIA.

Letters Patent No. 87,197, dated February 23, 1869.

IMPROVEMENT IN POTATO-DIGGER.

The Schedule referred to in these Letters Patent and making part of the same.

*To all whom it may concern:*

Be it known that I, EPHRAIM PHILLIPS, of North Beaver township, in the county of Lawrence, in the State of Pennsylvania, have invented a new and useful Improvement in Potato-Diggers; and I do hereby declare that the following is a full, clear, and exact description of the same, reference being had to the accompanying drawings, and letters of reference marked thereon, making a part of this specification, in which—

Figure 1 is a plan view, and

Figure 2. a side elevation.

This invention consists in the combination of a digger, for unearthing potatoes from the hills where they grow, with fingers curved like horse-rake teeth, for separating the roots from the soil which the digger takes up with them, and with a trail, so called, for more thoroughly performing the work of removing the potatoes from the dirt.

To enable those skilled in the art to make and use my invention, I now proceed to describe its construction and operation.

Similar letters in the drawings refer to like parts.

In the drawings—

A represents a V-shaped frame, to the rear end of each side of which is attached a handle, $a$, in shape a plow-handle.

Cross-braces $a'$ $a''$ stiffen the frame.

From near the rear end of the frame A, projects downward a metallic U-shaped digger, B, the arms of which are secured, at their upper ends, one to each piece of the frame A, and the foot of the digger being pointed at its front side.

The digger is drawn straight through a row of potato-hills, and cuts under and lifts up a section of roots and soil combined, of a width regulated by the two half shovels $b$ $b$, attached, one to each side piece of the frame in front of the digger, which shovels are some two inches nearer together than the sides of the digger, and pare off the sides of the row.

The mass of soil and roots lifted by the digger needs to be separated, and for this purpose I provide four or more fingers, $c$ $c$ $c$ $c$, attached at their forward ends to the rear of the under side of the digger, and curved upward, and then downward, as shown, so that their rear ends scratch the ground, and thus cause a shaking of the fingers, and a falling through of the dirt.

Auxiliary to the fingers, I employ horizontal bars $d$ $d$ $d$, one between each pair of fingers, which bars are furnished with branches, $d'$, slanting backward, each bar, with its branches, constituting what I term a trail, and all the trails assisting the fingers to more thoroughly discharge their separating-function.

The fingers $c$ are rigidly attached, while the trails $d$ are pivoted to a rod running along the rear of the cutter, and may be raised or lowered at pleasure.

What I claim as new, and desire to secure by Letters Patent, is—

The cutter B, in combination with the fingers $c$ and trails $d$, as and for the purpose described.

EPHRAIM PHILLIPS.

Witnesses:
MARKS J. MONASH,
J. W. REYNOLDS.